(12) United States Patent
Frost et al.

(10) Patent No.: US 10,910,859 B2
(45) Date of Patent: Feb. 2, 2021

(54) SMART CELLS AND CONTROL METHODS AND SYSTEMS

(71) Applicant: OXFORD UNIVERSITY INNOVATION LTD, Oxford (GB)

(72) Inventors: Damien Frost, Oxford (GB); David Howey, Oxford (GB)

(73) Assignee: OXFORD UNIVERSITY INNOVATION LTD, Oxford (GB)

( * ) Notice: Subject to any disclaimer, the term of this patent is extended or adjusted under 35 U.S.C. 154(b) by 308 days.

(21) Appl. No.: 15/752,088

(22) PCT Filed: Aug. 12, 2016

(86) PCT No.: PCT/GB2016/052507
§ 371 (c)(1),
(2) Date: Feb. 12, 2018

(87) PCT Pub. No.: WO2017/025756
PCT Pub. Date: Feb. 16, 2017

(65) Prior Publication Data
US 2018/0241239 A1    Aug. 23, 2018

(30) Foreign Application Priority Data
Aug. 12, 2015    (GB) .................................. 1514330.8

(51) Int. Cl.
*H02J 7/00* (2006.01)
*G06F 17/16* (2006.01)
*H01M 10/42* (2006.01)

(52) U.S. Cl.
CPC .......... *H02J 7/00711* (2020.01); *G06F 17/16* (2013.01); *H02J 7/00* (2013.01);
(Continued)

(58) Field of Classification Search
CPC ..... Y02E 60/12; H02J 7/0016; H01M 10/441; H01M 10/425; G01R 31/3658
See application file for complete search history.

(56) References Cited

U.S. PATENT DOCUMENTS 6,040,680 A    3/2000   Toya et al.
2012/0206102 A1   8/2012   Okamura et al.
(Continued)

FOREIGN PATENT DOCUMENTS

CN    1501565 A    6/2004
CN    102969778 A    3/2013
(Continued)

OTHER PUBLICATIONS

UK Search Report dated Jan. 22, 2016 in corresponding Patent Application No. GB1514330.8, 5 pages.
(Continued)

*Primary Examiner* — Arun C Williams
(74) *Attorney, Agent, or Firm* — Carter, DeLuca & Farrell, LLP (57) ABSTRACT

A smart cell, comprising: a positive terminal; a negative terminal; a switching circuit which is arranged to select between a first switching state in which an energy storage device is connected between the positive terminal and the negative terminal and a second switching state in which bypasses said energy storage device; and an inductor provided between the positive terminal and the negative terminal. The inductor provides a means by which to monitor current changes in the rest of the circuit. The inductor can thus be used to detect current changes as seen by the smart cell and this sensed information can be used to control the smart cell, e.g. to control an energy source (energy storage device) that forms part of the smart cell. As the inductor is part of the smart cell, it forms part of a decentralized controller strategy to regulate the state of charge of cells
(Continued)

within a larger system. For example, it may form part of a decentralized controller strategy to regulate the state of charge of serially connected cells of varying capacities.

35 Claims, 6 Drawing Sheets

(52) U.S. Cl.
CPC ............ *H02J 7/007* (2013.01); *H02J 7/0016* (2013.01); *H02J 7/0019* (2013.01); *H01M 10/4257* (2013.01); *H02J 2207/20* (2020.01)

(56) References Cited

U.S. PATENT DOCUMENTS

| | | | | |
|---|---|---|---|---|
| 2013/0049703 | A1* | 2/2013 | Perisic | H01M 10/44 320/162 |
| 2013/0187612 | A1* | 7/2013 | Aiura | H01M 10/425 320/118 |
| 2014/0057684 | A1* | 2/2014 | Khlat | H04W 52/0209 455/574 |
| 2015/0115736 | A1 | 4/2015 | Snyder | |
| 2015/0171639 | A1 | 6/2015 | Saeki et al. | |
| 2015/0222137 | A1 | 8/2015 | Wang et al. | |

FOREIGN PATENT DOCUMENTS

| | | |
|---|---|---|
| CN | 103155346 A | 6/2013 |
| CN | 103348576 A | 10/2013 |
| WO | 2011128849 A2 | 10/2011 |
| WO | 2012172468 A2 | 12/2012 |
| WO | 2014108645 A1 | 7/2014 |

OTHER PUBLICATIONS

International Search Report dated Dec. 7, 2016 in corresponding International Application No. PCT/GB2016/052507, 11 pages.
Chinese Office Action received from the Patent Office of the Peoples Republic of China corresponding to International Patent Application No. 201680059899.1 dated Oct. 22, 2020, translation attached.

* cited by examiner

SMART CELLS AND CONTROL METHODS AND SYSTEMS

CROSS-REFERENCE TO RELATED APPLICATIONS

This application is a U.S. National Stage entry under 35 U.S.C. § 371 of International Application No. PCT/GB2016/052507, filed on Aug. 12, 2016, which claims the benefit of and priority to GB Patent Application No. 1514330.8, filed on Aug. 12, 2015, the entire contents of each of which are hereby incorporated by reference herein.

TECHNICAL FIELD

The invention relates to smart cells and control methods and systems for such cells.

BACKGROUND

Power electronics is playing a key role in the reduction of greenhouse gas emissions through the integration of green energy technologies with the grid. One area of increased power electronics penetration is electrical energy storage systems such as lithium-ion battery packs, where the market is growing very rapidly. This rapid adoption of grid-connected energy storage requires state of the art power electronic converters and energy management systems. Furthermore, since the energy storage device (batteries, for example) is the most expensive component, the power electronics should be designed to maximise performance and lifetime whilst ensuring safety. In the worst case scenario, an unmanaged series string of batteries will be limited by the weakest cell, thus a single failed cell can render the entire string useless.

In energy storage systems that use electrochemical cells, long term pack performance can be greatly improved by active energy management at the individual cell level, by placing an individual power converter and battery management system on every cell. Recent advancements in wide band gap switching devices, whose cost is expected to decrease over time, will increase conversion efficiencies (and reduce power losses), and reduce overall system costs through higher power density and decreased cooling requirements.

For certain cell chemistries, individual cell monitoring is necessary, and active cell balancing enhances performance. As an example, lithium ion battery technology is unsafe if overcharged, where cells may explode or rupture. Therefore, in order to maximize the energy storage potential of several cells connected in series and/or in parallel, the state of charge (SOC) of individual cells in a battery pack must be measured and balanced.

Batteries (or other energy storage devices) that incorporate an element of control or management of the charging and/or discharging of the energy storage device may be referred to as smart cells. The energy storage device may include any of batteries (particularly rechargeable batteries), capacitors, supercapacitors, etc. A cell may include a small pack or sub-pack of storage devices. The level of granularity is adjustable by the designer.

Battery management systems (BMS) (a typical form of smart cell control) are used in every modern battery pack to ensure that the cells which make up the pack are operated within their safety limits. As the battery pack ages, the capacity of each cell changes over time in a non-uniform manner, and the state of charge of individual cells begin to drift apart from each other. To avoid this drift, the BMS will balance the state of charge of each individual cell, usually through a dissipative means. For example, during the charging phase, cells which reach their maximum voltage before others will be connected to a discharging resistor until all of the cells in the pack are fully charged. This method of balancing cells works well for well-matched battery packs, however when cells of varying capacities are connected together it is very inefficient and slow.

A modular multi-level converter topology is essentially a series string of energy storage devices, each of which can be connected in line (i.e. to supply energy or receive energy) or bypassed (i.e. not supplying or receiving energy). Such arrangements are typically used for DC to AC voltage conversion, where each module includes a capacitor. By controlling how many (and which) capacitors in the string to connect in series, the output voltage of a node on the string can be varied so as to produce the desired waveform (e.g. a sinusoidal AC waveform).

BRIEF SUMMARY

According to a first aspect, the invention provides a smart cell, comprising: a positive terminal; a negative terminal; a switching circuit which is arranged to select between a first switching state in which an energy storage device is connected between the positive terminal and the negative terminal and a second switching state which bypasses said energy storage device; and an inductor provided between the positive terminal and the negative terminal.

The inductor provides a means by which to monitor current changes in the rest of the circuit. The inductor can thus be used to detect current changes as seen by the smart cell and this sensed information can be used to control the smart cell, e.g. to control an energy source (energy storage device) that forms part of the smart cell. As the inductor is part of the smart cell, it forms part of a decentralized controller strategy to regulate the state of charge of cells within a larger system. For example, it may form part of a decentralized controller strategy to regulate the state of charge of serially connected cells of varying capacities.

Another advantage of providing an inductor as part of the smart cell is that it forms part of a distributed filtering inductor. A filtering inductor would normally be provided for a string of cells (e.g. in a modular multi-level controller) as a single separate component in series with the cells. Splitting this into several smaller inductors in a distributed arrangement allows smaller components to be used, which can significantly reduce cost.

The invention may be used in energy storage systems to balance the state of charge on every cell in a battery pack. It can also be used in larger contexts, where instead of managing the state of charge of an individual cell, it could be used to manage the state of the charge of one or more battery packs.

Preferably the inductor is in series with the switching circuit. This means that the inductor is always connected between the positive and negative terminals regardless of the switching state of the switching circuit, i.e. regardless of whether an energy source is connected between the terminals or is bypassed. In this configuration the inductor can continue to act as a current change detector and as part of a distributed filtering inductor even when the switching circuit is in a bypass state. The inductor may be connected either side of the switching circuit, i.e. between the switching circuit and the positive terminal or between the switching circuit and the negative terminal. The inductor need not be directly connected to either terminal or to the switching circuit (there may be other intervening components or circuits).

Preferably the smart cell further comprises a controller arranged to monitor the voltage across the inductor and arranged to control the switching circuit based on said inductor voltage.

In a modular multi-level control topology, it has been found that this enables a local controller to determine when to switch in and out its energy storage device. This avoids the need for an overall controller that controls all modules (i.e. it permits decentralized control). One advantage of this is that the local controller can travel with its own energy storage device, retaining information about its history, e.g. state of health (SOH) and state of charge (SOC) information. Another advantage of the local controller is that there is no need for a system-wide communications bus to transfer information between cells or between the cells and a separate system-wide controller.

The controller may be arranged to adjust the switching timing of the switching circuit based on the inductor voltage. The switching circuit will typically switch its energy storage device in and out on a periodic cycle having a time period, a duty cycle (which may be represented as a proportion of the time period in which the storage device is connected rather than bypassed) and a phase (which may be represented as a start time relative to the start of the cycle). Adjusting the switching timing of the switching circuit may include adjusting any of: the duty cycle, the phase, the time period or frequency of the switching cycle.

The controller may be arranged to perform any kind of control function according to the desired characteristics of the system. However, in some preferred embodiments the controller is arranged to determine, based on the inductor voltage, a desired timing for the switching circuit that minimises the impact on the output voltage ripple (e.g. of a series string of smart cells) and is arranged to adjust the timing for the switching circuit towards the desired timing.

For a DC to DC converter, it is desirable to minimise the output voltage ripple so as to provide the smoothest possible output. In a string of series-connected energy storage devices, every time a device is switched in or out the output voltage jumps. If two devices are connected simultaneously, or at very similar times then the voltage jump will be large (i.e. there is a large ripple). It is therefore desirable to minimise this so that the output voltage overall is as consistent as possible. As each controller in the system can detect the switching events of other devices within the system via its inductor, each controller can attempt to minimise its impact on the overall voltage ripple by varying its timing.

Although the controller could adjust its timings to exactly the calculated desired timings, this may result in instability when several such controllers all operate individually at the same time. In order to encourage an equilibrium situation to be reached it is preferred that the controllers each make smaller timing adjustments towards the target timings. Preferably the controller is arranged to adjust the timing at a rate proportional to a duty cycle of the switching circuit. The duty cycle is likely to vary slightly from one cell to another and therefore this avoids synchrony with other cells in a system and encourages the different cells to adjust at different rates, thus avoiding unstable operation.

In some preferred embodiments the controller is arranged to: detect changes of current within the system; analyze said changes to determine the switching times of other cells; calculate desired switching timings for the smart cell based on said changes of current; and adjust the switching timings of the smart cell by adjusting its timings towards the desired switching timings.

The changes in current may be detected by measuring the voltage across the inductor. Preferably to analyze the current changes, the controller is arranged to perform edge detection on the detected current in the system to detect switching times of other cells. As the controller is local to the cell, it cannot easily determine which edges belong to which other cells. In fact, in the most general case it will not even know how many other cells there are in the system, or of what type they are. The detected edges therefore cannot easily be associated with a particular cell. This presents a difficulty in the analysis as it is not possible to determine when a cell switches on and when it switches off, i.e. how long its duty cycle is. Without this information a complete working model of the system is not available. However, as will be explained in more detail later in this document, it has been discovered that detecting the edges in the system current is sufficient to enable a solution to be found. The control algorithm thus allows multiple independent energy sources (energy storage devices) to work together towards a common goal.

Preferably to analyze the changes, the controller is arranged to combine the switching times into pairs of a switching on time and a switching off time. This pairing does not need to match a particular on time and off time, i.e. the on and off times do not need to correspond to the same cell (which the controller cannot determine). Instead, any on and off can be paired together and it can be shown that this is equivalent to matching the correct on and off times. This greatly simplifies the analysis process and allows the system to be modelled in a computationally efficient manner such that the required optimization can be performed.

Preferably the controller is further arranged to form vectors from the pairs, each vector being defined by an angle that is determined by taking the average of the switching on time and the switching off time relative to the switching period of the smart cell and a magnitude equal to the sine of the difference between the switching on time and the switching off time.

This particular transformation has been found to further simplify the optimization problem for determining the optimum switching times for the cell. As will be discussed in more detail below, the optimization problem can be expressed as minimizing a Fourier series expression for the ripple voltage. With this transformation a vector sum of the vectors thus defined is mathematically equivalent to the optimization problem with the Fourier series expanded to first order only. The transformation and vector sum is significantly less intensive to compute than the full Fourier expression and thus allows the optimization problem to be calculated more efficiently and faster. Even though the optimization is only to first order (i.e. the fundamental) of the Fourier series, it has been found, surprisingly, that this leads to a stable solution faster and more reliably than optimizing to a higher order.

Therefore preferably the controller is arranged to minimize the magnitude of the vector sum of all said vectors. This may be achieved by performing the vector sum with the cell's own timings omitted (either omitted from the pairing process, or with the cell's own vector subtracted from the final vector sum). The optimum timings for the cell can then be determined by setting the cell's desired vector to be in the opposite direction to the vector sum and reversing the vector transformation to determine the optimum timings for the cell.

The switching timings may be adjusted simply by adjusting the phase of the switching cycle to an earlier or later time. However, in an alternative, the controller may be arranged to adjust the switching timings by adjusting the switching period of the smart cell. The choice of phase shifting method used may be based on the available hardware in the system. The controller may be arranged to adjust the switching timings by adjusting the timings at a rate proportional to the duty cycle of the smart cell. As discussed above, the duty cycles generally vary between different cells and therefore this has the advantage of causing convergence on the desired timings at different rates which better avoids unstable states.

By distributing the inductor amongst a plurality of cells, the individual inductors can be made smaller. The minimization of components reduces cost. In particularly preferred arrangements, the inductor may be formed as a PCB trace. This is one of the most cost-efficient ways to make an inductor.

It will be appreciated that the energy storage device may comprise at least one of a battery, a rechargeable battery, a capacitor or a super-capacitor, or combinations thereof. Other energy storage devices may be used instead. Additionally, the size of the energy storage devices may vary greatly depending on the application. The invention may be used for series connected rechargeable batteries for personal or home devices, but it is expected to be particularly useful in grid-connected energy storage devices which may be of much larger overall capacity (e.g. made up from a very large number of smaller cells). In particular, used cells (e.g. from discarded consumer electronics devices or electric vehicles) which may have degraded from their original capacity may be re-used by combining them together with suitable control electronics into large multi-cell energy storage devices which may be grid-connected. This provides an inexpensive source of storage and is environmentally friendly by re-using cells that would otherwise be deemed end-of-life. For example battery packs for an electric vehicle will no longer be of useful service (and deemed end-of-life) when they cannot support the required range of the vehicle, but may still have significant storage potential that is usable for other applications.

In some embodiments the energy storage device may comprise a plurality of smaller storage devices in parallel and/or series, with a controller arranged to control the energy supply from said smaller devices. The controller that controls such a set of parallel cells may be the same controller as is used as described above for interacting with other series-connected smart cells, or it may be a separate controller that only controls the parallel array of sub-cells.

According to another aspect, the invention provides a smart cell system comprising a plurality of smart cells, said cells being connected in series. The smart cells may be as described above, optionally including any of the optional or preferred features also described above. The plurality of smart cells may form a multilevel converter. The multi-level converter may be a DC to DC converter or it may be a DC to AC converter. A multi-level converter formed of a plurality of smart cells could be used in an application where battery cells and super capacitors and other energy storage devices are mixed together in the same string of smart cells. This type of application may be useful for electric vehicles and hybrid vehicles where frequent charge and discharge cycles are present. Furthermore, a series string of smart cells would be very applicable in some electric drivetrain architectures where a large conversion ratio is needed from the battery to the motor drive electronics.

The smart cell system may comprise a plurality of multilevel converters in parallel, i.e. several strings of cells in parallel, each string comprising cells in series, in order to increase the overall capacity of the system to a desired value.

In some preferred embodiments the system may be designed to discharge and charge each cell in a series string of cells proportional to its capacity. By using each cell in proportion to its capacity, the weaker cells are used less and the stronger cells are used more. This avoids the problem of the weakest cell in the string failing and causing the whole string to become inoperational. Instead, all cells should reach their individual maximum charge and/or maximum discharge at around the same time, maximizing the overall usage of all the cells as well as extending the lifetime of each individual cell. The duty cycle of each cell is varied according to its capacity such that the cells self-regulate. In the case of a battery cell used in a smart cell, the duty cycle may be determined by comparing the capacity of the battery cell to a given, maximum capacity that would be found in the system. This maximum capacity may be preset by the system designer, or programmed into the system at any time (e.g. updated as batteries are added and/or removed). Alternatively it may in some embodiments be possible to sense or otherwise determine (or estimate) the capacities of other cells in the system and thus determine a maximum capacity value. In the eventual event of a cell failure, the smart cell switching circuit can automatically bypass the failed cell, thus the string remains operational.

It will be appreciated that the smart cell may include the energy storage device or it may be supplied separately. For example the smart cell controller and switching circuitry may be supplied with an empty slot or holder for receiving an energy storage device (such as a rechargeable battery cell or battery pack) or it may be supplied with terminals to which a separate energy storage device may be connected.

According to another aspect, the invention provides a method of controlling a smart cell within a multi-cell system, comprising: detecting changes of current within the system; analyzing said changes to determine the switching times of other cells; calculating desired switching timings for the smart cell based on said changes of current; adjusting the switching timings of the smart cell by adjusting its timings towards the desired switching timings.

The preferred features described above also apply to this method. Therefore said analyzing preferably comprises performing edge detection on the detected current in the system to detect switching times of other cells. Said analysing preferably comprises a step of detecting the voltage levels to detect when multiple smart cells switch on or off at the exact same time. Said analyzing preferably comprises combining said switching times into pairs of a switching on time and a switching off time. The method may further comprise forming vectors from said pairs, each vector being defined by an angle that is determined by taking the average of the switching on time and the switching off time relative to the switching period of the smart cell and a magnitude equal to the sine of the difference between the switching on time and the switching off time. Said analyzing may comprise minimizing the magnitude of the vector sum of all said vectors. Adjusting the switching timings may comprise adjusting the switching period of the smart cell. Adjusting the switching timings may comprise adjusting the timings at a rate proportional to the duty cycle of the smart cell.

As discussed above, one of the biggest advantages of the invention is that it enables a large battery pack to balance the state of charge on every cell without any communication necessary between the cells. This greatly simplifies the wiring and sensing necessary within the battery pack. Furthermore, it is envisaged that the power electronics and control algorithm can be packaged together with the cell itself. Therefore, information about the cell's state of health and state of charge will always travel with the cell, for example, if it is installed in another device.

Also, the invention allows modular systems to be designed where the number of cells in the string (i.e. in the pack) is not fixed. Instead, new cells can be added when desired or when available and old cells can be removed as they degrade or if not required any longer. Such flexibility is particularly well suited to the decentralized control model.

In some preferred embodiments, the system will discharge and charge cells of varying capacity in proportion to their capacity. By using a modified modular multilevel converter (MMC) topology, it is possible to achieve this goal. The general MMC topology allows one to connect a cell to the output, or bypass the cell completely.

The control algorithm works because it has been shown through a detailed theoretical analysis (described further below) that it is possible to get a smooth output from a string of switching cells using the information available locally at each cell.

The invention can be used in any scenario where energy sources of varying capacity are connected in series. As well as installing this algorithm at the cell level, it is possible to use the same algorithm with larger packs of cells, or even different combinations of energy sources, like battery cells and fuel cells.

As well as being particularly effective at the cell level in a decentralized control scheme, the invention can also be applied in to a centralized controller controlling a string of series connected smart cells, e.g. in an MMC arrangement. The centralized controller has the advantage of knowing information about all cells in the system and therefore does not need to sense current changes in the system to determine the operation of those cells. However, the process of selecting optimum phases to minimise the output voltage ripple is still applicable in the centralized controller. As discussed above, the transformation of the switching timings (phase and duty cycle) into a vector form and the recognition that minimising only the fundamental of the Fourier series performs well, and applies equally well in the centralized control model. In the centralized control scheme, there is no need for each cell to have its own inductor and a more traditional external filtering inductor may be used instead. This aspect of the invention can therefore be applied to cells which do not have a local inductor and/or local controller.

Thus according to a further aspect, there is provided a controller for a plurality of series connected smart cells, said controller being arranged to produce a periodic switching signal for each smart cell, said switching signal alternating between a first switching state and a second switching state and said switching signal being defined by a phase and a duty cycle; wherein said controller is arranged to define a vector for each smart cell, the angle of said vector being defined as the phase of the switching signal and the magnitude of the vector being defined as the sine of the duty cycle of the switching signal; and wherein said controller is arranged to minimize the magnitude of the vector sum of all said vectors.

As described above, this process determines phases for each cell that minimise the output voltage ripple of the string of cells.

The phase defines the time (within a switching cycle) at which an energy storage device within the smart cell is connected in series in the string. The energy storage device is then maintained in the series-connected state for the duration of the duty cycle and is then switched into the bypassed state.

One particular application of this centralized controller is that it can keep monitoring capacities of the storage devices and, as they change over time, it can adjust the duty cycles and adjust the phases to maintain the minimum output voltage ripple. Another advantage is that the controller can adjust duty cycles dynamically in order to balance cells of different capacities, e.g. to load cells differently so as to balance their states of charge, or provide a particular power output, or desired operation. Throughout this process, the phases can be continually adjusted to minimise output voltage ripple. An example of this would be a system of smart cells which contains both batteries and super capacitors. The duty cycles corresponding to the super capacitors will change rapidly over time, with respect to the duty cycles of the batteries, which will change very slowly over time.

Any optimization technique may be used to perform the minimization step. Depending on the processing power of the controller, the phases may be optimized fast in software or hardware before signals are generated. In some embodiments the controller may provide an initial phase for each smart cell and then perform an iterative process in which in each iteration each phase is adjusted towards a more optimal phase. In this way signals can be generated immediately and then be evolved towards the optimal solution over a short period of time.

As discussed above, the controller may be arranged to adjust each phase at a rate proportional to the duty cycle of the associated smart cell. Also as discussed above, the controller may be arranged to adjust the phases by adjusting the switching period of the associated smart cell.

According to a further aspect of the invention, there is provided a method of controlling a plurality of series connected smart cells by generating a periodic switching signal for each smart cell, said switching signal alternating between a first switching state and a second switching state and said switching signal being defined by a phase and a duty cycle; said method comprising: defining a vector for each smart cell, the angle of said vector being defined as the phase of the switching signal and the magnitude of the vector being defined as the sine of the duty cycle of the switching signal; and determining the phases that minimise the magnitude of the vector sum of all said vectors.

The method may comprise: providing an initial phase for each smart cell; and performing an iterative process in which in each iteration each phase is adjusted towards a more optimal phase. Each phase may be adjusted at a rate proportional to the duty cycle of the associated smart cell. The phases may be adjusted by adjusting the switching period of the associated smart cell.

BRIEF DESCRIPTION OF THE DRAWINGS

Preferred embodiments of the invention will now be described, by way of example only and with reference to the accompanying drawings in which.

In brief, the systems described below work as follows: Each cell monitors the voltage across the local inductor. Theoretically we have shown that identifying the switching events in the string of cells is enough to determine when the local cell should switch on and off to minimize the output current ripple, and therefore the output voltage ripple. The local cell then adjusts the phase shift of its switching actions relative to the other cells in the string, to minimize the output voltage ripple.

DETAILED DESCRIPTION

The embodiments described here pertain to the series connection of cells of varying capacities. They are designed such that the cells are charged and discharged in proportion to their capacity.

Figure 1A:
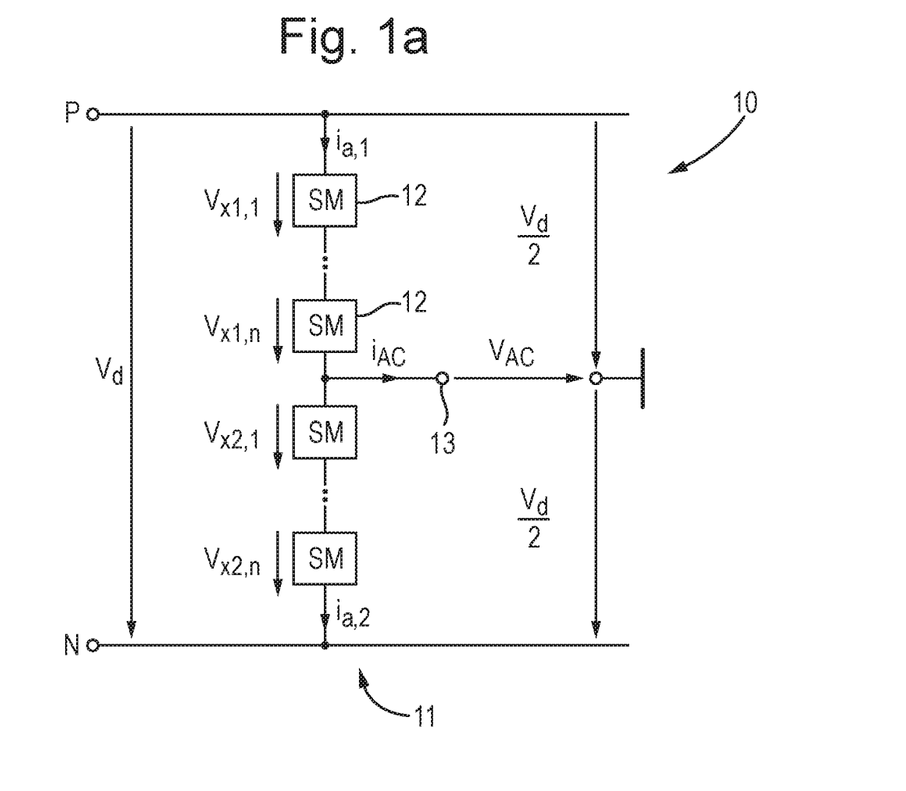
FIGS. 1a and 1b show a standard MMC architecture.

A modified modular multilevel converter (MMC) topology is used to load each cell with a current proportional to its capacity. The MMC topology is a well-known topology used for high voltage direct current (dc) to alternating current (ac) power conversion. FIG. 1a shows a schematic of a standard MMC converter 10 made up of a string 11 of sub-modules 12 connected between a positive rail P and a negative rail N. A sub-module 12 is shown in more detail in FIG. 1b. Each sub-module 12 comprises an energy storage device 14 such as a battery or capacitor (although any energy storage device may be used). Sub-module 12 has two switches $S_R$ and $S_F$ which are always in opposite states. When $S_R$ is on (and $S_F$ is off), the energy storage device 14 is connected in series with any other energy storage devices in the string 11. When $S_F$ is on (and $S_R$ is off), the energy storage device 14 is bypassed, i.e. it is not connected into the series string 11.

The output of the converter 10 is taken from central node 13. The voltage at node 13 can be varied by controlling how many of the sub-modules 12 on the positive side and how many modules 12 on the negative side of node 13 connected their respective energy sources 14 in the series string 11 and how many bypass their energy sources 14.

Figure 1B:
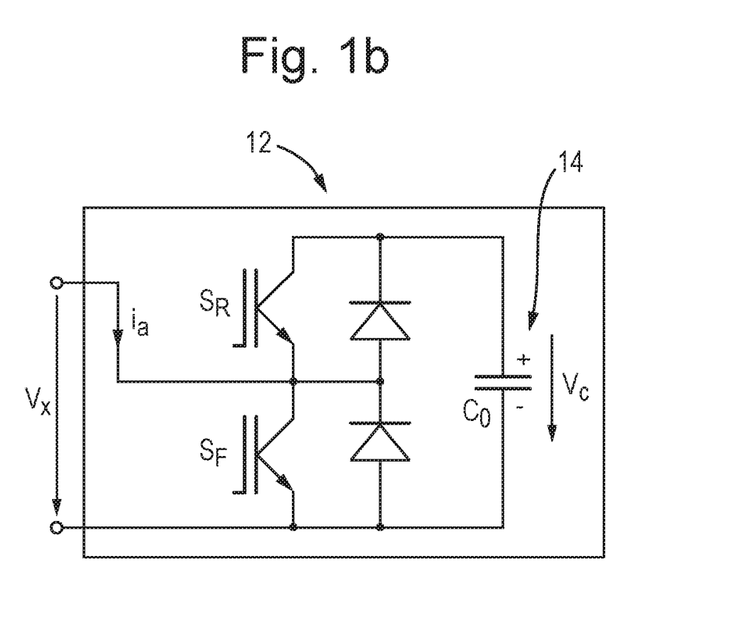

Each sub-module is able to connect the local energy storage source 14 into the series string 11, or bypass it, by sending the appropriate gating commands to the power semiconductor switches $S_R$, $S_F$.

Figure 2:
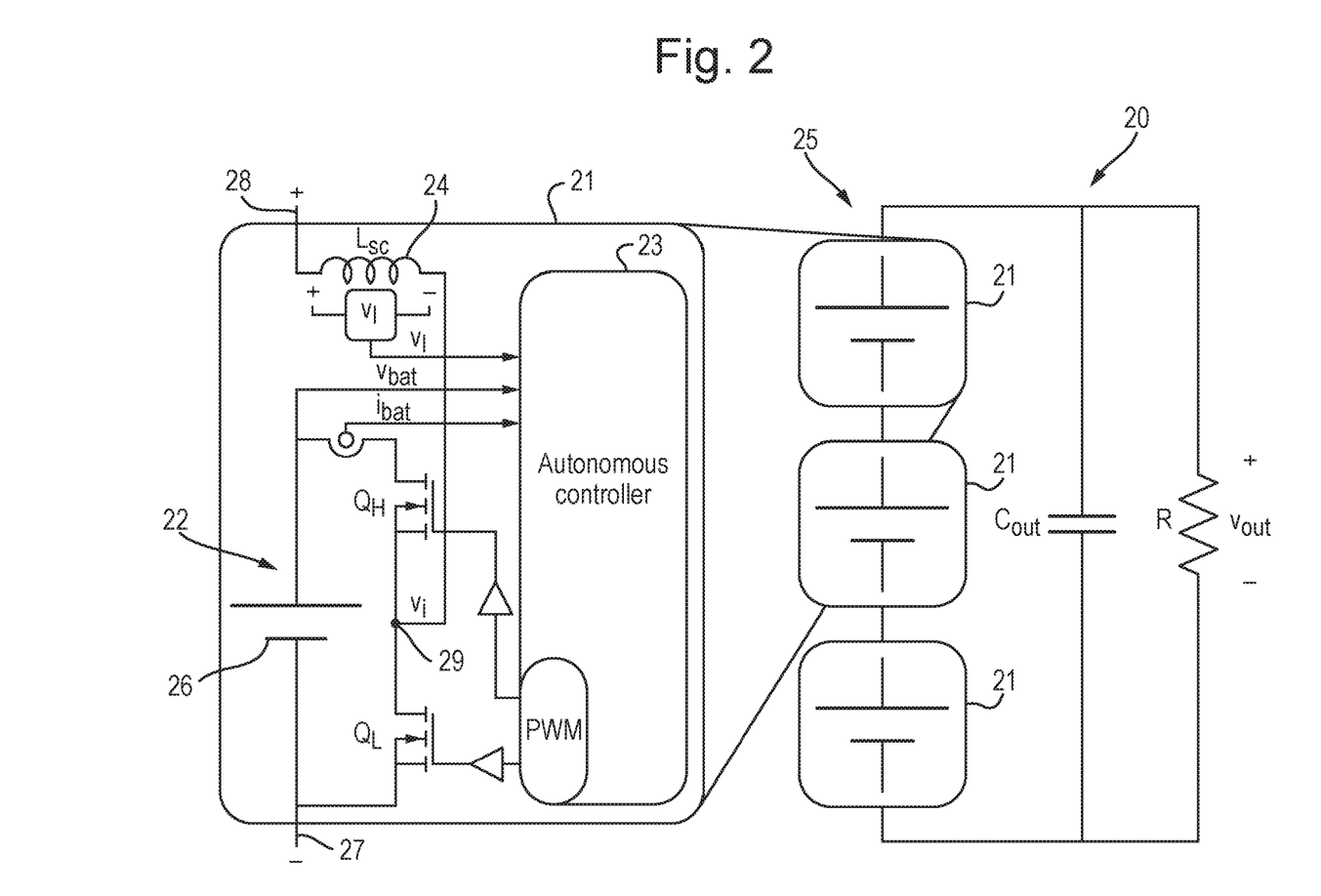
FIG. 2 shows an example system architecture according to the invention.

In the embodiment of the invention shown in FIG. 2, a small inductor 24 ($L_{SC}$) is added into the sub-module 21.

In the following description we present a cell level battery management system and power converter which uses a decentralized controller strategy to regulate the state of charge of serially connected cells of varying capacities. The distributed battery management system is designed to discharge and charge each cell in a series string of cells proportional to its capacity. The converters are controlled in such a way as to minimize the size of the filtering components in the series string, and therefore minimize the output voltage ripple.

Each smart cell 21 uses an autonomous controller 23 to determine its optimal switching pattern to reduce the output voltage ripple. This algorithm is based on a Fourier analysis of the waveform generated by several smart cells 21 connected in series. It uses the voltage sensed across the small inductor 24 ($L_{sc}$), in each smart cell 21 to determine what the other cells 21 are doing, and calculate new switching times.

The following description goes into more detail about how the algorithm works, and the equations involved.

System Architecture

An example of the proposed system architecture is shown in FIG. 2. FIG. 2 shows a Modular Multi-level Controller (MMC) 20. In this example, the system is constructed out of three MMC cells 21 each containing a half bridge switching network 22 similar to the switching networks found in the sub-modules of other known MMC converters. Depending on the state of the switches, the switching network 22 either connects the energy storage device 26 between the negative terminal 27 and positive terminal 28 of the submodule 21 or it bypasses the energy storage device 26. However each submodule 21 (also referred to herein as a 'smart cell'), has two distinct features that make it different from a standard MMC submodule (such as sub-module 12 shown in FIG. 1b):

1. There exists an independent, autonomous controller 23 in each smart cell 21.
2. Each smart cell 21 includes a small filter inductor 24, $L_{sc}$.

The autonomous controllers 23 are used to synchronize the switching events of all of the sub-modules 21 in a string 25 of smart cells to minimize the overall ripple voltage at the output, $v_{out}$. Each autonomous controller 23 also manages the state of charge (SOC), and monitors the state of health (SOH) of its locally connected battery cell 26. This information is used to apply a duty cycle to the switches $Q_L$ and $Q_H$, such that the connected battery cell 26 discharges in proportion to its capacity. Discharging all battery cells 26 in proportion to their respective capacities yields two large benefits for the string of smart cells 25

1. The SOC of all of the battery cells 26 in the string 25 will be synchronized.
2. Larger, healthier battery cells 26 will be loaded more than the smaller, more degraded battery cells 26, thus the pack 25 will degrade at a more uniform rate.

The voltage across the small filter inductor, $L_{sc}$ is used by the autonomous local controller 23 to determine the optimal switch timings for $Q_H$ and $Q_L$. Furthermore, by splitting the output filter inductor amongst every smart cell 21, the inductance is reduced. In some implementations $L_{sc}$ could be small enough to be implemented on the trace of a PCB, thus greatly reducing the cost and size of this component. The dc output load simply requires a filter capacitor, $C_{out}$, i.e. with no additional inductor external to the smart cells 21.

Optimal Switching Pattern

In order to minimize the output voltage ripple measured at $v_{out}$ an optimal switching pattern of all of the switches $Q_H$ and $Q_L$ is determined. This is done by all smart cells 21 collectively minimizing the ac rms inductor current. To help solve this problem, a few assumptions will be made about the system of smart cells 21.

Problem and Assumptions

Given a set of M battery cells $B_i=\{B_1, B_2, \ldots, B_M\}$ with capacities $C_i=\{C_1, C_2, \ldots, C_M\}$, our objective is to find a set of phases, $\phi_i=\{\phi_1, \phi_2, \ldots, \phi_M\}$ for the turn-on of each smart cell which will minimize the ripple current in local inductor $L_{sc}$, and thus minimize the output ripple voltage.

For simplicity, the nominal voltages of all of the battery cells will be $V_{nom}=V_1=V_2=\ldots=V_M$, which is a reasonable assumption because the SOC of all of the battery cells 26 will be synchronized. The duty cycle of each smart cell 21 can be calculated using the following equation:

$$D_i = \frac{C_i}{C_{MAX}} \quad (1)$$

where $C_{MAX}$ is the maximum capacity expected amongst all of the battery cells 26, or ideally, the maximum value found in the capacity array such that $0 \leq D_i \leq 1$ for all i. In some embodiments $C_{MAX}$ may be input by the designer when the system is first constructed.

In a series string of smart cells 25, the voltage applied to each inductor, $L_{sc}$, will be identical. Thus, we can group all of the distributed inductors together to be considered as a single inductor, $L=ML_{sc}$. The voltage across L will be determined by the sum of all of the $v_i$ voltages of the smart cells, and the output dc voltage. The output dc voltage is given by (2):

$$V_{out} = \sum_{i=1}^{M} D_i V_{nom} = \sum_{i=1}^{M} \frac{C_i}{C_{MAX}} V_{nom} = \frac{V_{nom}}{C_{MAX}} \sum_{i=1}^{M} C_i \quad (2)$$

The ac root mean squared (rms) value of the inductor ripple current can be expressed by (3):

$$I_{Lac\text{-}rms} = \sqrt{\frac{1}{T_s} \int_0^{T_s} \left[ I(s) + \frac{1}{L} \int_s^t (v_{out}(\tau) - V_{out}) d\tau \right]^2 dt} \quad (3)$$

where I(s) is the anti-derivative of $(v_{out}(s)-V_{out})/L$, $\tau$ and s are dummy variables of integration, and t is time. $T_s$ is the switching period. The variable $v_{out}(t)$ is defined by (4):

$$v_{out}(t) = \sum_{i=1}^{M} v_i(t) \quad (4)$$

where $v_i(t)$ is the output voltage of the $i^{th}$ smart cell 21 as measured from the negative terminal 27 of the battery cell 26 to the output terminal 29 of the transistors, as shown in FIG. 2. Therefore, $v_{out}(t)$ is the output voltage of a series string 25 of smart cells 21.

Determine $I_{Lac\text{-}rms}$

Figure 3:
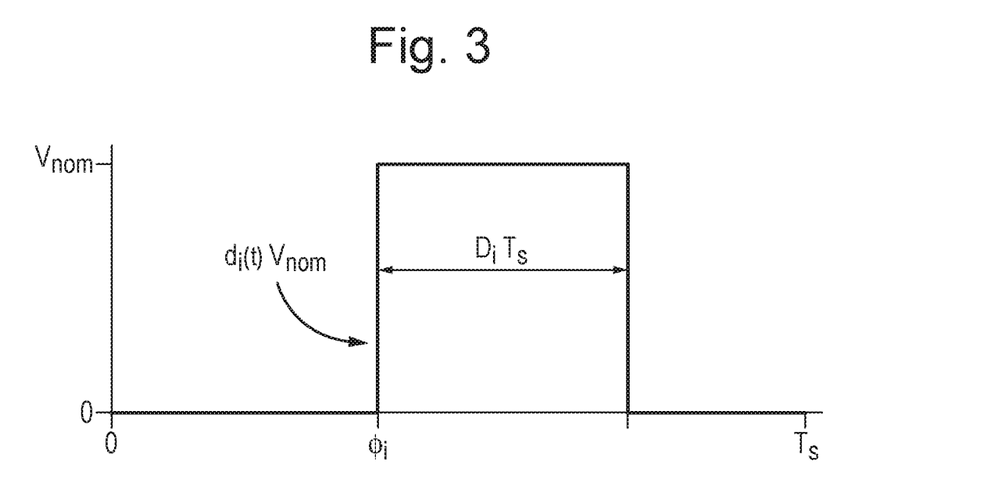
FIG. 3 illustrates the output voltage of a smart cell of the system as measured from the output of the switching network, point $v_t$ in FIG. 2.

In order to determine an optimal set of phase angles $\phi_i$ a function which describes the output of a smart cell 21 in terms of $\phi_i$ needs to be derived. The output voltage of a smart cell 21 will generally look like a periodic rectangular wave, as shown in FIG. 3. Specifically, FIG. 3 shows the output voltage, $d_i(t)V_{nom}$, of a smart cell 21 with phase $\phi_i$, duty cycle $D_i$, and switching period, $T_s$.

Using the generalized values in FIG. 3, the Fourier Series representation of the output voltage of any smart cell 21 can be derived, and it is shown in equations (5)-(9).

$$v_i(t) = d_i(t) V_{nom} \quad (5)$$

$$d_i(t) = \frac{a_{0i}}{2} + \sum_{n=1}^{\infty} \left[ a_{ni} \cos\left(\frac{2\pi n t}{T_s}\right) + b_{ni} \sin\left(\frac{2\pi n t}{T_s}\right) \right] \quad (6)$$

where $$a_{0i} = 2d_i \quad (7)$$

$$a_{ni} = \frac{1}{n\pi} \left( \sin\left(2\pi n \left(D_i + \frac{\phi_i}{T_s}\right)\right) - \sin\left(2\pi n \frac{\phi_i}{T_s}\right) \right) \quad (8)$$

$$b_{ni} = \frac{1}{n\pi} \left( \cos\left(2\pi n \frac{\phi_i}{T_s}\right) - \cos\left(2\pi n \left(D_i + \frac{\phi_i}{T_s}\right)\right) \right) \quad (9)$$

Now we can substitute (5) into (4) and solve for $I_{Lac\text{-}rms}^2$ using (3). It can be shown that the result is:

$$I_{Lac\text{-}rms}^2 = \frac{1}{2} \left( \frac{V_{nom} T_s}{2\pi L} \right)^2 \sum_{n=1}^{\infty} \sum_{i=1}^{M} \sum_{j=1}^{M} \frac{4}{\pi^2 n^4} \left[ \sin(\pi n D_i) \sin(\pi n D_j) \cos\left(\pi n \left(D_i - D_j + 2\frac{\phi_i}{T_s} - 2\frac{\phi_j}{T_s}\right)\right) \right] \quad (10)$$

Now let $\theta_x = 2\pi \phi_x / T_s$, so that the switching angles can be measured in radians instead of time:

$$I_{Lac\text{-}rms}^2 = \frac{1}{2} \left( \frac{V_{nom} T_s}{2\pi L} \right)^2 \sum_{n=1}^{\infty} \sum_{i=1}^{M} \sum_{j=1}^{M} \frac{4}{\pi^2 n^4} \quad (11)$$

$$[\sin(\pi n D_i) \sin(\pi n D_j) \cos(\pi n (D_i - D_j) + n(\theta_i - \theta_j))]$$

Equation (11) can now be minimized to determine an optimal set $\theta_i$ that will minimize the ac rms current in the inductor $L_{SC}$, and therefore, the output voltage ripple in $v_{out}$.

Simplifying the Problem

Examining (11), we immediately see that solving for an optimal set $\theta_i$ to minimize $I_{Lac\text{-}rms}$ is non trivial, and difficult to achieve without significant computational power and global information about the system. Therefore in this section we present a way to identify a set $\theta_i$ which will yield a satisfactory solution, with significantly less computational requirement, in a decentralized fashion.

Figure 4:
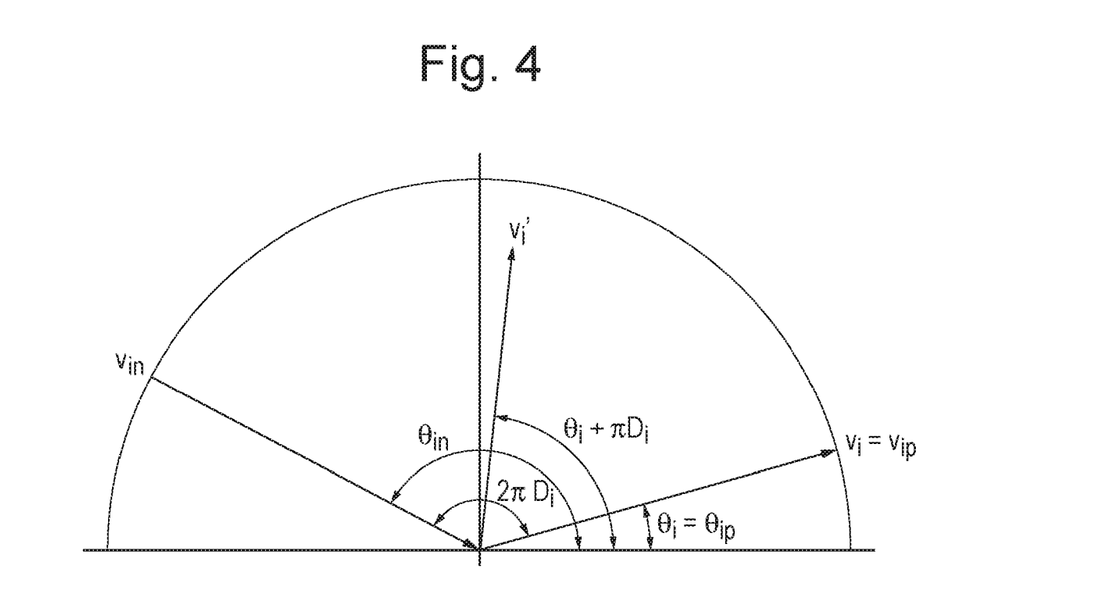
FIG. 4 illustrates the timings of a smart cell as phases and vectors representing the smart cell timings and voltage.

First, let us represent the switching action of the $i^{th}$ smart cell 21 as a vector, $v_i$, in the unit circle as depicted in FIG. 4. The $i^{th}$ smart cell 21 will turn on at $\theta_i$, and turn off at $\theta_i + 2\pi D_i$. Now define a new vector, $v_i'$, whose phase places the vector half way between the turn on and turn off times and whose length is $\sin \pi D_i$. Thus, $v_i'$ is a weighted, phase shifted vector. The switching actions of the $i^{th}$ smart cell are also shown as vectors $v_{ip}$ and $v_{in}$ in FIG. 4. The phase and length of $v_i'$ are given by:

$$\angle v_i' = \theta_i' = \theta_i + \pi D_i \quad (12)$$

$$|v_i'| = \sin(\pi D_i) \quad (13)$$

Now apply the transformation described in (12) and (13) to all of the smart cells 21, and then sum all $v_i'$, we can find the square of the magnitude of the total sum vector, $|v_\Sigma'|^2$:

$$|v_\Sigma'|^2 = \sum_{i=1}^{M} \sum_{j=1}^{M} \sin(\pi D_i) \sin(\pi D_j) \cos(\pi (D_i - D_j) + \theta_i - \theta_j) \quad (14)$$

Equation (14) has the exact same form as (11) when n=1 (i.e. only the fundamental is considered). Therefore, one control algorithm that will yield a good but sub-optimal minimum of (11) is to minimize the magnitude of the total sum vector, $|v_\Sigma'|^2$. This algorithm is used in the simulation study and experimental setup, as presented in the following sections.

Implementation of the Control Algorithm

Calculating the magnitude of the total sum vector using the formula in Equation (14) still requires accurate knowledge of the duty cycles and phase shifts of all of the other smart cells 21. In order to eliminate communication between smart cells 21, this approach is still not ideal. The following section will address this issue.

Smart Cell Measurements

First, let us consider the measurements a smart cell 21 will be able to make. By measuring the voltage across its local inductor, each smart cell 21 will only know when other smart cells 21 are switching on or off. These switching actions are shown in FIG. 4 as vectors $v_{ip}$ and $v_{in}$.

Using FIG. 4 as reference, from the point of view of a single smart cell 21, it will see the switching actions of the $i^{th}$ smart cell 21 as two corresponding voltage transitions: a positive voltage transition across the inductor $L_{sc}$, depicted by the vector $v_{ip}$ with switching angle $\theta_{ip}$, and its negative corresponding voltage transition, depicted by the vector $v_{in}$ with switching angle $\theta_{in}$. For a smart cell 21 detecting only one other smart cell 21, the problem is very trivial and it is easy to determine not only when the other smart cell 21 is switching, but its duty cycle as well.

The challenge arises when multiple smart cells 21 start switching. As soon as a single smart cell 21 needs to determine the switching angles and duty cycles of two or more other smart cells 21, it is impossible to match every "on" transition with its corresponding "off" transition. We will now show that this is not necessary to yield the optimal solution as defined by (14).

First, use (15) and (16) to replace all of the $D_x$s and $\theta_x$s with the notation of FIG. 4.

$$\theta_i = \theta_{ip} \tag{15}$$

$$\pi D_i = \left(\frac{\theta_{in} - \theta_{ip}}{2}\right) \tag{16}$$

this yields an expression in terms of measured quantities:

$$|v'_\Sigma|^2 = \sum_{i=1}^{M}\sum_{j=1}^{M} \sin\left(\frac{\theta_{in}-\theta_{ip}}{2}\right)\sin\left(\frac{\theta_{jn}-\theta_{jp}}{2}\right)\cos\left(\left(\frac{\theta_{in}+\theta_{ip}}{2}\right)-\left(\frac{\theta_{jn}+\theta_{jp}}{2}\right)\right) \tag{17}$$

Equation (17) gives the magnitude of the total vector in terms of quantities measured by each smart cell 21. However, this equation still seems to imply that the "on" transitions must be correctly paired with each of their corresponding "off" transitions. We will now show that this is not the case by first considering the case where only one set of "on" transitions are swapped. Therefore, consider a set of M smart cells 21, where the $k^{th}$ and $l^{th}$ positive transitions are paired with the $l^{th}$ and $k^{th}$ negative transitions, respectively. It can be shown that:

$$|v'_\Sigma|^2 = \sum_{\substack{i=1 \\ i\neq k, i\neq l}}^{M}\sum_{\substack{j=1 \\ j\neq k, j\neq l}}^{M} \left[\sin\left(\frac{\theta_{in}-\theta_{ip}}{2}\right)\sin\left(\frac{\theta_{jn}-\theta_{jp}}{2}\right)\cos\left(\left(\frac{\theta_{in}+\theta_{ip}}{2}\right)-\left(\frac{\theta_{jn}+\theta_{jp}}{2}\right)\right)\right] + \\ \sin^2\left(\frac{\theta_{kn}-\theta_{lp}}{2}\right) + \sin\left(\frac{\theta_{ln}-\theta_{kp}}{2}\right)\sin\left(\frac{\theta_{kn}-\theta_{lp}}{2}\right) \\ \cos\left(\left(\frac{\theta_{ln}+\theta_{kp}}{2}\right)-\left(\frac{\theta_{kn}+\theta_{lp}}{2}\right)\right) + \sin^2\left(\frac{\theta_{ln}-\theta_{kp}}{2}\right) + \tag{18}$$

$$\sin\left(\frac{\theta_{kn}-\theta_{lp}}{2}\right)\sin\left(\frac{\theta_{ln}-\theta_{kp}}{2}\right)\cos\left(\left(\frac{\theta_{kn}+\theta_{lp}}{2}\right)-\left(\frac{\theta_{ln}+\theta_{kp}}{2}\right)\right) = \\ \sum_{i=1}^{M}\sum_{j=1}^{M}\sin\left(\frac{\theta_{in}-\theta_{ip}}{2}\right)\sin\left(\frac{\theta_{jn}-\theta_{jp}}{2}\right)\cos\left(\left(\frac{\theta_{in}+\theta_{ip}}{2}\right)-\left(\frac{\theta_{jn}+\theta_{jp}}{2}\right)\right)$$

By extension, we can swap any pair and any number of transitions with each other and get the same result. Therefore, in order to minimize the total sum vector of (14), each smart cell 21 need only know when the positive and negative transitions occur to determine its local optimal switching pattern. Moreover, it can be shown that these results are also true for all harmonics, 1 to n.

Controller Design

A MATLAB-Simulink model of a smart cell 21 using the theory set out above was built using the SimPowerSystems toolbox. The model uses the Simscape battery model and MOSFETs to simulate the power circuit. The controller 23 was implemented as an embedded MATLAB function, and is executed once per switching cycle when the upper MOSFET, $Q_H$, is switched on.

Figure 5:
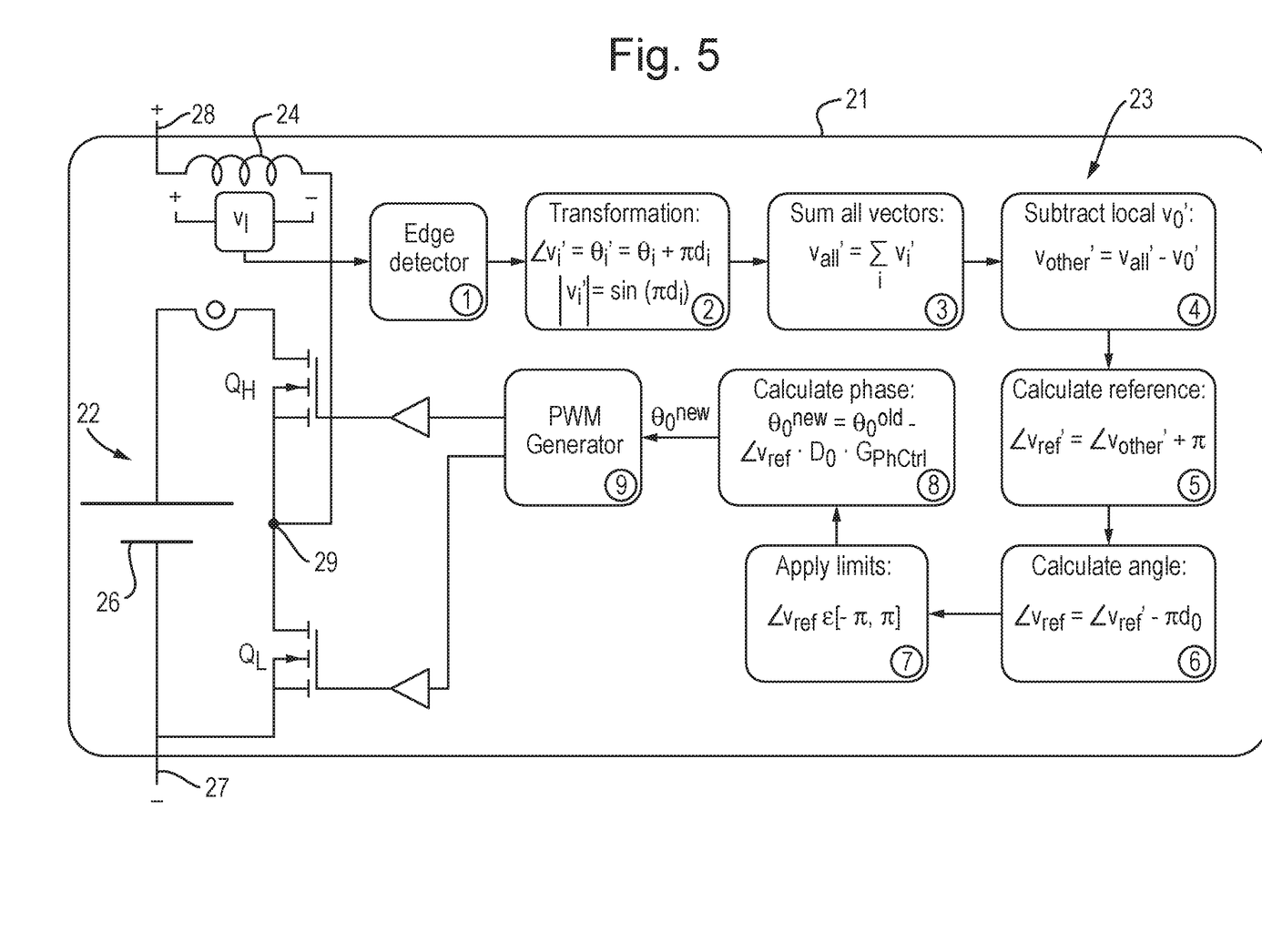
FIG. 5 illustrates the processing steps of a controller.

FIG. 5 illustrates the algorithm the controller 23 implements as a block diagram. Steps 1 through 8 (as indicated by the number in the circle in the bottom right corner of each box) are the steps implemented by the embedded MATLAB function which output the desired phase to the pulse width modulator (PWM) generator which produces gating signals to the switches in step 9.

1. Edge Detector: Detects all of the positive and negative transitions that occur during every switching cycle, $T_s$. The edge detector handles cases where multiple smart cells 21 turn on or off at the same time by tracking the different voltage levels measured with $v_1$.
2. Transformation: The positive and negative edges are paired together to form a set of sensed smart cells 21. The transformation described by (12) and (13) is applied.
3. Sum all vectors: All of the vectors found and transformed are added together as described by (14)
4. Subtract local $v_0'$: The vector which describes the switching action of the local cell is subtracted from the total sum vector to yield $v_{other}'$.
5. Calculate reference: In order to minimize the sum of the total vector, $\angle v_{ref}'$ is calculated by simply adding $\pi$ to $\angle v_{other}'$. In this way, the total sum vector is minimized.
6. Calculate angle: The actual phase shift of the local smart cell is calculated by reversing the transform of (12).
7. Apply limits: $+2\pi$ is added to $\angle v_{ref}$ until it lies between $-\pi$ and $\pi$.
8. Calculate phase: Finally, the phase that will be sent to the PWM generator is calculated by multiplying the phase error ($0-\angle v_{ref}$) by the duty cycle of the local smart cell, $D_0$, and a gain of $G_{PhCtrl}$. By multiplying the error by the duty cycle, the phase shifts of smart cells with different capacities will change at different rates, allowing the system to find an equilibrium point.
9. PWM Generator: $\theta_0^{new}$ is used by the PWM generator to produce gating signals for the MOSFETs.

Simulation Study

A simulation study of a series string 25 of three smart cells 21 was undertaken. FIG. 2 shows a schematic of the 3 smart cell pack. Table 1 lists the simulation parameters used.

TABLE 1

Parameters of the three smart cell simulation study

| Description | Parameter | Value |
|---|---|---|
| Battery Cell Capacities | $C_1$ | 0.75 Ah |
|  | $C_2$ | 1.20 Ah |
|  | $C_3$ | 3.00 Ah |
| Smart Cell Parameters | $L_{sc}$ | 100 µH |
|  | $f_s$ | 50 kHz |
|  | $V_{nom}$ | 4.19 V |
| Output | $C_{out}$ | 4.7 µF |
|  | R | 23.5 Ω |

The simulation includes the three smart cells operating completely independently of each other. The optimal switching controller is turned on 1.0 ms into the simulation. A value of $C_{MAX}=4.00$ Ah was pre-programmed into each smart cell.

Figure 6:
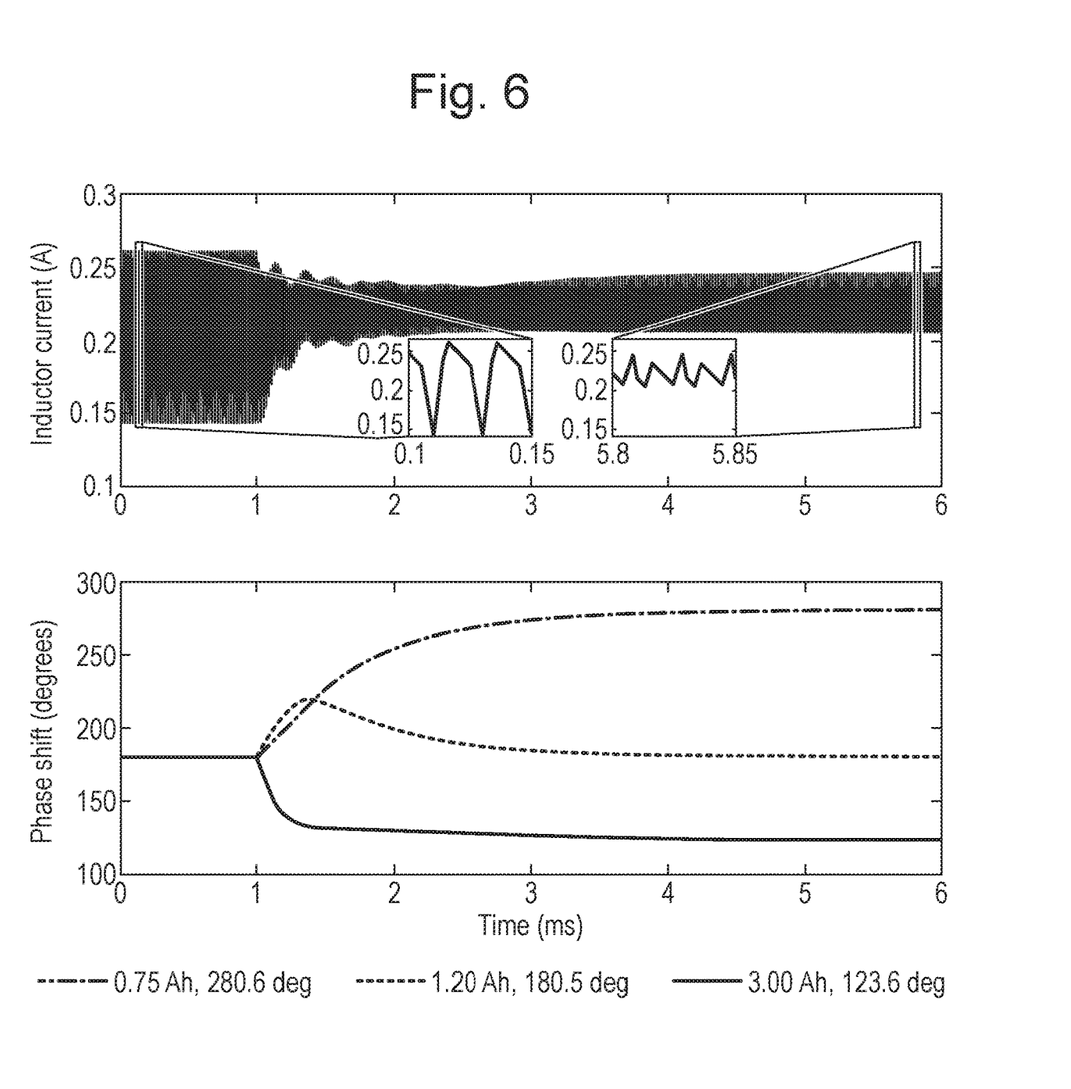
FIG. 6 shows the results of a simulation.

FIG. 6 shows how different characteristics of the system evolve over the length of the simulation. At the beginning of the simulation, all three smart cells turn on at the same time, and turn off in proportion to their capacity which produces a very high ac rms ripple current in the inductor, as shown in the top graph. The bottom graph shows how the phase of each smart cell varies over time, and as a consequence, the ripple current in the inductor is greatly reduced, as seen by the inset graphs. At the beginning of the simulation, $I_{Lac-rms}$ is 34 mA rms, and the peak-to-peak output voltage, $v_{out-pp}$, is 64 mV. After the optimal switching controller is engaged, the phase shift of each smart cell gradually evolves smoothly into its steady state value. At the end of the simulation, $I_{Lac-rms}$ and $v_{out-pp}$ have improved considerably to 10 mA rms and 11 mV, respectively.

Experimental Results

The theory developed in this work was tested in the laboratory with an experimental setup consisting of three smart cells in series, as shown in FIG. 2 using the parameters listed in Table 2. The hardware was built around ARM's mbed platform, where each smart cell is implemented with the NUCLEO-F401RE board and a custom printed circuit board (PCB) containing the power stage. They were tested using laboratory power supplies.

The NUCLEO-F401RE board was chosen for its relatively powerful micro-controller, the STM32F401RET6, in order to focus attention on how the smart cell controller can be implemented in hardware. The STM32F401RET6 is based on the ARM 32-bit Cortex-M4 CPU and has a floating point unit.

Figure 7:
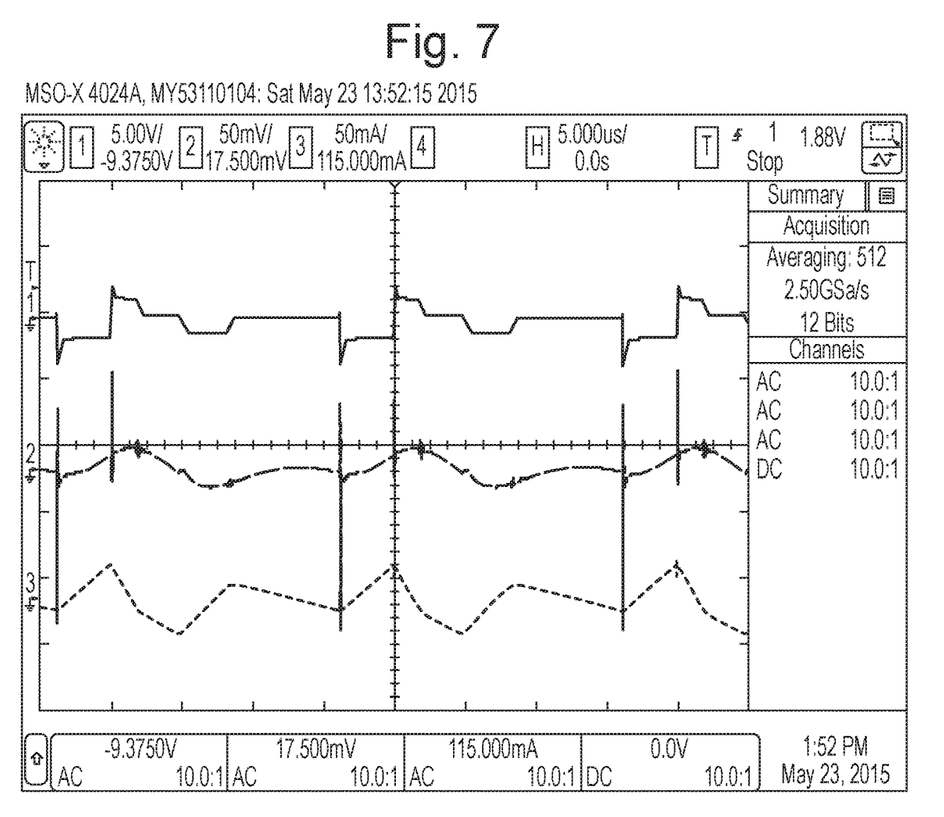
FIG. 7 shows an oscilloscope screenshot of an experiment.

FIG. 7 shows an oscilloscope screen shot of the three smart cells operating and finding their optimal switching pattern, averaging applied with 512 samples. In FIG. 7, Channel 1 (top) is the voltage across $L_{sc}$ of the first smart cell with a capacity of $C_1$. Channel 2 (middle) is the output voltage ripple. Channel 3 (bottom) is the current in the smart cell inductors.

Figure 8:
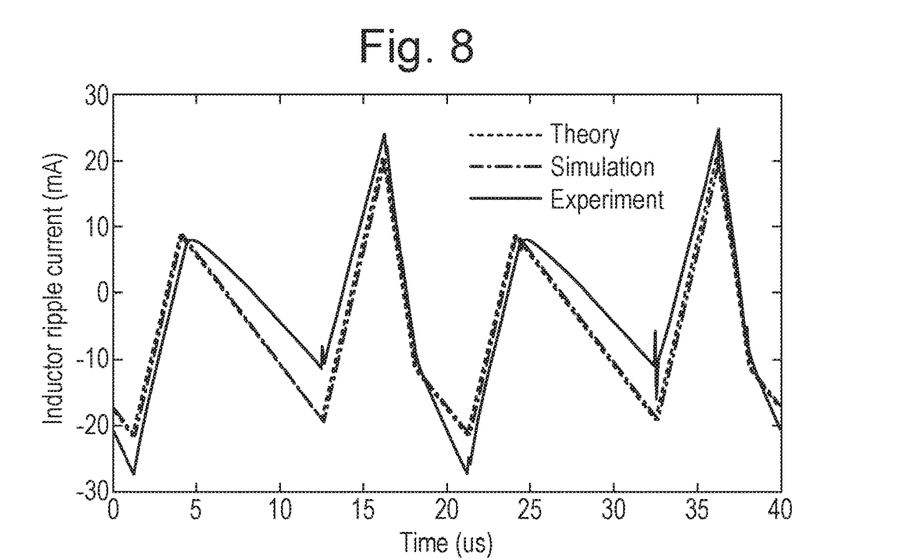
FIG. 8 shows a comparison of the experiment with the theory and simulation.

Using the data from the oscilloscope, we can plot the measured $L_{sc}$ current along with the theoretical and simulated $L_{sc}$ currents, and this is shown in FIG. 8. The experimental $L_{sc}$ current matches very well with the theoretical and simulated values, and is well within experimental error when the variation of the inductance of each $L_{sc}$ is taken into account, which is ±20% for the Vishay Dale IHLP6767GZER101M11 inductor used in these experiments.

The peak-to-peak voltage ripple from the experiments was reduced to 24 mV from 78 mV and the peak-to-peak $L_{sc}$ current ripple was reduced to 54 mA from 102 mA.

CONCLUSIONS

The energy management of series-connected battery cells 26 has been addressed with a novel decentralised battery management system based on an MMC topology. Each MMC submodule 21, or smart cell, operates autonomously within a string 25 to minimize the output ripple voltage and balance the batteries 26. A smart cell 21 contains a completely decentralized controller 23, and a small inductor, $L_{sc}$, used to sense transitions in the rest of the string 25. A theoretical approach has been developed to minimise the output voltage ripple by deriving an equation for the ac rms ripple current in the smart cell inductors using Fourier decomposition, taking as inputs the duty cycle and switching phase of each smart cell 21 and minimising this. This result can be applied to MMC converters in general. In order to simplify the approach so that it can be locally applied in a set of autonomous smart cell controllers 23 a solution has also been derived that yields optimal results when considering only the fundamental harmonic by minimising the magnitude of the total sum vector of all smart cell voltages. The theory has been demonstrated in simulation and experimental results, where a system of three smart cells 21 were able to find a stable operating point, and the output voltage ripple was reduced from 78 mV to 24 mV.

The invention claimed is:

1. A smart cell, comprising:
    a positive terminal;
    a negative terminal;
    a switching circuit which is arranged to select between a first switching state in which an energy storage device is connected between the positive terminal and the negative terminal and a second switching state which bypasses said energy storage device; and
    an inductor provided between the positive terminal and the negative terminal, wherein the inductor is in series with the switching circuit, such that the inductor is always connected between the positive and negative terminals regardless of the switching state of the switching circuit.

2. A smart cell as claimed in claim 1, wherein said inductor is in series with said switching circuit.

3. A smart cell as claimed in claim 1, further comprising a controller arranged to monitor the voltage across the inductor and arranged to control the switching circuit based on said inductor voltage.

4. A smart cell as claimed in claim 3, wherein the controller is arranged to adjust the switching timing of the switching circuit based on said inductor voltage.

5. A smart cell as claimed in claim 3, wherein the controller is arranged to determine, based on said inductor voltage, a desired timing for the switching circuit that minimises the impact on voltage ripple and is arranged to adjust the timing for the switching circuit towards the desired timing.

6. A smart cell as claimed in claim 5, wherein the controller is arranged to adjust the timing at a rate proportional to a duty cycle of the switching circuit.

7. A smart cell as claimed in claim 1, wherein the controller is arranged to:
    detect changes of current within the system;
    analyze said changes to determine the switching times of other cells;
    calculate desired switching timings for the smart cell based on said changes of current; and
    adjust the switching timings of the smart cell by adjusting its timings towards the desired switching timings.

8. A smart cell as claimed in claim 7, wherein to analyze said changes, said controller is arranged to perform edge detection on the detected current in the system to detect switching times of other cells.

9. A smart cell as claimed in claim 8, wherein to analyze said changes, said controller is arranged to combine said switching times into pairs of a switching on time and a switching off time.

10. A smart cell as claimed in claim 9, wherein said controller is further arranged to:
form vectors from said pairs, each vector being defined by an angle that is determined by taking the average of the switching on time and the switching off time relative to the switching period of the smart cell and a magnitude equal to the sine of the difference between the switching on time and the switching off time.

11. A smart cell as claimed in claim 10, wherein said controller is arranged to minimize the magnitude of the vector sum of all said vectors.

12. A smart cell as claimed in claim 4, wherein the controller is arranged to adjust the switching timings by adjusting the switching period of the smart cell.

13. A smart cell as claimed in claim 4, wherein the controller is arranged to adjust the switching timings by adjusting the timings at a rate proportional to the duty cycle of the smart cell.

14. A smart cell as claimed in claim 1, wherein the inductor is formed as a PCB trace.

15. A smart cell as claimed in claim 1, wherein said energy source comprises at least one of: a battery, a rechargeable battery, a capacitor, a super-capacitor or combinations thereof.

16. A smart cell as claimed in claim 15, wherein said energy source comprises a plurality of smaller sources in parallel and/or series with a controller arranged to control the energy supply from said smaller sources.

17. A smart cell system comprising a plurality of smart cells according to claim 1, said cells being connected in series.

18. A smart cell system as claimed in claim 17, wherein said plurality of smart cells forms a multilevel converter.

19. A smart cell system as claimed in claim 18, comprising a plurality of multilevel converters in parallel.

20. A method of controlling a smart cell within a multi-cell system, comprising:
detecting changes of current within the system;
analyzing said changes to determine the switching times of other cells, wherein said analyzing comprises performing edge detection on the detected current in the system to detect switching times of other cells;
calculating desired switching timings for the smart cell based on said changes of current; and
adjusting the switching timings of the smart cell by adjusting its timings towards the desired switching timings.

21. A method as claimed in claim 20, wherein said analyzing comprises combining said switching times into pairs of a switching on time and a switching off time.

22. A method as claimed in claim 21, further comprising forming vectors from said pairs, each vector being defined by an angle that is determined by taking the average of the switching on time and the switching off time relative to the switching period of the smart cell and a magnitude equal to the sine of the difference between the switching on time and the switching off time.

23. A method as claimed in claim 22, wherein said analyzing comprises minimising the magnitude of the vector sum of all said vectors.

24. A method as claimed in claim 20, wherein adjusting the switching timings comprises adjusting the switching period of the smart cell.

25. A method as claimed in claim 20, wherein adjusting the switching timings comprises adjusting the timings at a rate proportional to the duty cycle of the smart cell.

26. A controller for a plurality of series connected smart cells, said controller being arranged to produce a periodic switching signal for each smart cell, said switching signal alternating between a first switching state and a second switching state and said switching signal being defined by a phase and a duty cycle;
wherein said controller is arranged to define a vector for each smart cell, the angle of said vector being defined as the phase of the switching signal and the magnitude of the vector being defined as the sine of the duty cycle of the switching signal; and
wherein said controller is arranged to minimise the magnitude of the vector sum of all said vectors.

27. A controller as claimed in claim 26, wherein the controller provides an initial phase for each smart cell and then performs an iterative process in which in each iteration each phase is adjusted towards a more optimal phase.

28. A controller as claimed in claim 27, wherein the controller is arranged to adjust each phase at a rate proportional to the duty cycle of the associated smart cell.

29. A controller as claimed in claim 27, wherein the controller is arranged to adjust the phases by adjusting the switching period of the associated smart cell.

30. A controller as claimed in claim 26, wherein said controller is arranged to adjust said duty cycles dynamically in order to balance cells of different capacities.

31. A method of controlling a plurality of series connected smart cells by generating a periodic switching signal for each smart cell, said switching signal alternating between a first switching state and a second switching state and said switching signal being defined by a phase and a duty cycle; said method comprising:
defining a vector for each smart cell, the angle of said vector being defined as the phase of the switching signal and the magnitude of the vector being defined as the sine of the duty cycle of the switching signal; and
determining the phases that minimise the magnitude of the vector sum of all said vectors.

32. A method as claimed in claim 31, comprising:
providing an initial phase for each smart cell; and
performing an iterative process in which in each iteration each phase is adjusted towards a more optimal phase.

33. A method as claimed in claim 32, wherein each phase is adjusted at a rate proportional to the duty cycle of the associated smart cell.

34. A method as claimed in claim 32, wherein the phases are adjusted by adjusting the switching period of the associated smart cell.

35. A method as claimed in claim 30, comprising adjusting said duty cycles dynamically in order to balance cells of different capacities.

* * * * *